United States Patent [19]

Christ

[11] Patent Number: 4,617,123

[45] Date of Patent: Oct. 14, 1986

[54] PROCESSES AND INSTALLATIONS FOR TREATING WASTE WATERS ISSUING FROM THE MANUFACTURE OF SAUERKRAUT

[76] Inventor: Charles Christ, 65 rue de Paris, 72160 Connerre, France

[21] Appl. No.: 719,806

[22] Filed: Apr. 4, 1985

[30] Foreign Application Priority Data

Apr. 11, 1984 [FR] France .................................. 84 05741

[51] Int. Cl.⁴ .............................. C02F 3/02; C02F 3/34
[52] U.S. Cl. ..................................... 210/611; 210/625; 210/627; 210/631; 210/195.2; 210/905; 426/656
[58] Field of Search .............. 210/611, 630, 631, 627, 210/905, 626, 625, 195.2, 195.3, 257.2, 652; 426/656

[56] References Cited

U.S. PATENT DOCUMENTS

| | | | |
|---|---|---|---|
| 3,676,334 | 7/1972 | Zuckerman et al. | 210/905 |
| 3,838,198 | 9/1974 | Bellamy et al. | 210/631 |
| 3,961,078 | 6/1976 | Stitt | 210/631 |
| 4,159,944 | 7/1979 | Erickson et al. | 210/606 |
| 4,267,049 | 5/1981 | Erickson et al. | 210/606 |

FOREIGN PATENT DOCUMENTS

| | | | |
|---|---|---|---|
| 2356604 | 1/1978 | France | 210/611 |
| 2505315 | 11/1982 | France | 210/611 |
| 57-21996 | 2/1982 | Japan | 210/631 |

Primary Examiner—Benoit Castel
Attorney, Agent, or Firm—Birch, Stewart, Kolasch & Birch

[57] ABSTRACT

The present invention concerns a process and an installation for the treatment of waste waters issuing from the manufacture of sauerkraut, this process and installation comprising a biological treatment step for treating waste waters leading to the formation of a precipitate, and the subsequent treatment of the aqueous separated phase in a reverse osmosis apparatus.

2 Claims, 1 Drawing Figure

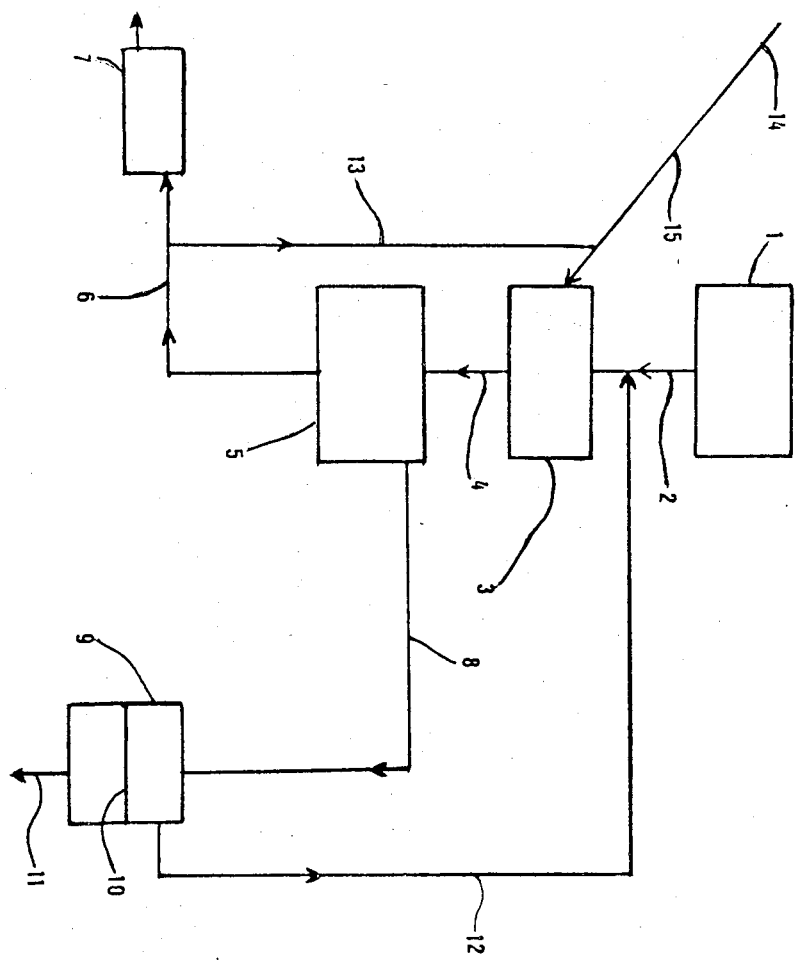

PROCESSES AND INSTALLATIONS FOR TREATING WASTE WATERS ISSUING FROM THE MANUFACTURE OF SAUERKRAUT

BACKGROUND OF THE INVENTION

The present invention concerns an improvement in the processes for treating waste waters issuing from the manufacture of sauerkraut, as well as installations intended for this purpose.

BACKGROUND OF THE PRIOR ART

It is known that waste waters issuing from installations or plants for the manufacture of sauerkraut have various origins, namely:
  waters from washing and blanching of the sauerkraut;
  fermentation juice (beginning and end) emanating from the sauerkraut, with their purification raising numerous problems.

It is known, furthermore, that it is possible to purify these waste waters by a biological treatment involving a sowing by using a inoculum consisting of *Candida crusei* and *Candida utilis*. Such processes and installations are described in French Patent filed under No. 77 24 342 as well as its Certificate of Addition filed under No. 81 09 202.

The waste waters thus treated lead to the obtaining of a precipitate adapted, after separation, to be utilized as a proteinic aliment or foodstuff. The purified liquid effluent, separated from the precipitate thus formed, has qualities rendering possible its treatment in treatment basins of used waters installed by municipal councils. It would, however, be of great interest to dispose of a process allowing the total purification of waste waters issuing from the manufacture of sauerkraut and to obtain directly a totally purified effluent; it would thus be possible to reduce costs of treating waste waters.

BRIEF DESCRIPTION OF THE INVENTION

The present invention proposes overcoming the drawbacks of known processes and obtaining a purity rate that is sufficiently high for disposing of these effluents directly into river waters.

The process according to the present invention for treating waste waters issuing from the manufacture of sauerkraut consists in subjecting the said waste waters to a treatment comprising the following steps:
  biological treatment, in aerobic conditions resulting from the injection of an oxygenation agent, through the action of an inoculum of *Candida crusei* and/or *Candida utilis*, at a temperature comprised between 30° and 49° C.;
  separation of the formed precipitate and the floating liquid fraction;
  treating the liquid fraction resulting from the above-mentioned separation to reverse osmosis using membranes, the cut-off threshold of which is lower than 100 Å, the residue which forms about 10% of the liquid fraction remaining upstream from the membrane, being partially returned to the biological treatment step.

According to one embodiment of the invention, the precipitate separated from the floating liquid fraction is, after drying, recovered as proteinic yeast or alimentary complement.

The object of the present invention is, furthermore, an installation for carrying out this process.

BRIEF DESCRIPTION OF THE DRAWING

Other aims and advantages of the invention will become apparent from reading the following description made with reference to the single FIGURE given by way of non-limitative example, this FIGURE representing an installation for operating the process according to the invention.

DETAILED DESCRIPTION OF THE DRAWING

The annexed FIGURE represents in 1 an installation for the manufacture of sauerkraut from which the waste waters are recovered through pipe 2. These waste waters are carried along to a fermenter 3 in which the biological treatment is carried out using an inoculum the origin of which will be indicated herein-below. After undergoing this biological treatment, the liquor is carried through pipe 4 into a separation zone 5 in which is separated, on the one hand, through pipe 6 into a precipitate that undergoes in zone 7 a drying treatment allowing for the recovery of a proteinic foodstuff, and on the other hand, a floating liquid fraction containing from 10 to 15% of impurities, which is gathered in separation zone 5 and is brought transferred through pipe 8 into a reverse osmosis zone 9 containing a membrane 10.

A purified liquid effluent consisting of water having a purity higher than 99% is drawn off in 11.

Through pipe 12 is withdrawn the residue, formed upstream of the membrane 10 and thus not subjected to the osmosis treatment. This residue, corresponding to approximatively 10% of the liquid fraction carried by pipe 8, is returned into pipe 2 in order to be further subjected to the biological treatment in the fermenter 3.

The sowing in fermenter 3 results in a fresh inoculum introduced by pipe 14 into pipe 15 which opens into the fermenter. Also, a part of the precipitate carried in pipe 6 can be combined with the feed inoculum introduced through pipe 15.

Of course, the present invention is in no way limited to the embodiment described and represented herein-above, it is adaptable to numerous variants available to the man skilled in the art without departing from the scope and spirit of the invention.

I claim:

1. A method of treating waste waters issuing from the manufacture of sauerkraut comprising the steps of:
  introducing the waste water into a fermenter where it is biologically treated, under aerobic conditions with an inoculum of *Candida crusei* and/or *Candida utilis*, at a temperature of between 30° and 49° to form a precipitate and a floating liquid fraction;
  separating the formed precipitate from the floating liquid fraction, drying the separated precipitate, and recovering therefrom a foodstuff complement;
  treating the floating liquid fraction to reverse osmosis under a pressure higher than the osmotic pressure, using membranes, the cut-off threshold of which is lower than 100 Å, separating the residue which forms about 10% of the liquid fraction and which remains upstream from the membrane, and returning at least a portion of this residue to the biological treatment step.

2. An installation for treating waste waters issuing from the manufacture of sauerkraut which comprises
  a fermenter,
  means for introducing the waste water to be treated into the fermenter where it is treated under aerobic conditions to form a precipitate and a floating liquid fraction, a separation zone operatively connected with the fermenter for separating the precipitate from the floating liquid fraction, a dryer zone operatively connected to the separation zone for drying the separated precipitate and recovering a foodstuff complement, a chamber for conducting reverse osmosis, said chamber containing a membrane with a cut-off threshold lower than 100 Å, said chamber being pressurized upstream of the membrane, means for introducing the floating liquid fraction into said chamber, a pipe for the recovery of the purified effluent from said chamber, a return pipe connected to the chamber upstream from the membrane and to the fermenter for recycling untreated material to the fermenter, and means for recovering purified water from the chamber.

* * * * *